(12) United States Patent
Inaba et al.

(10) Patent No.: US 10,749,186 B2
(45) Date of Patent: Aug. 18, 2020

(54) METHOD FOR MANUFACTURING PLATINUM CATALYST, AND FUEL CELL INCLUDING THE SAME

(71) Applicants: THE DOSHISHA, Kyoto (JP);
Ishifuku Metal Industry Co., Ltd., Tokyo (JP)

(72) Inventors: Minoru Inaba, Kyoto (JP); Hideo Daimon, Kyoto (JP); Kosuke Okuno, Kyoto (JP); Shunya Higuchi, Kyoto (JP); Yuki Matsui, Kyoto (JP); Naoya Aoki, Saitama (JP); Hideo Inoue, Saitama (JP); Takehito Nishikawa, Saitama (JP)

(73) Assignee: THE DOSHISHA, Tokyo (JP)

( * ) Notice: Subject to any disclaimer, the term of this patent is extended or adjusted under 35 U.S.C. 154(b) by 0 days.

(21) Appl. No.: 15/554,470

(22) PCT Filed: Mar. 8, 2016

(86) PCT No.: PCT/JP2016/057170
§ 371 (c)(1),
(2) Date: Aug. 30, 2017

(87) PCT Pub. No.: WO2016/143784
PCT Pub. Date: Sep. 15, 2016

(65) Prior Publication Data
US 2018/0047993 A1 Feb. 15, 2018

(30) Foreign Application Priority Data

Mar. 10, 2015 (JP) .................. 2015-047090
Aug. 4, 2015 (JP) .................. 2015-154501
Oct. 6, 2015 (JP) .................. 2015-198803

(51) Int. Cl.
*B01J 23/44* (2006.01)
*B01J 35/08* (2006.01)
(Continued)

(52) U.S. Cl.
CPC ............. *H01M 4/88* (2013.01); *H01M 4/921* (2013.01); *H01M 4/926* (2013.01); *H01M 2008/1095* (2013.01)

(58) Field of Classification Search
CPC ... B01J 23/44; B01J 35/08; B01J 37/14; B01J 37/18; H01M 4/88; H01M 4/921; H01M 4/926
See application file for complete search history.

(56) References Cited

U.S. PATENT DOCUMENTS 7,691,780 B2 * 4/2010 Adzic ................. H01M 4/8657
429/494
7,855,021 B2 * 12/2010 Adzic ................. H01M 4/8657
429/424
(Continued)

FOREIGN PATENT DOCUMENTS

JP 2013-013878 1/2013
JP 2014-512252 5/2014
(Continued)

OTHER PUBLICATIONS

Zhang, et al., Platinum Monolayer Electrocatalysts for O2 Reduction, J. Phys. Chem. B, vol. 108, pp. 10955-10964, 2004.
(Continued)

Primary Examiner — Cam N. Nguyen
(74) Attorney, Agent, or Firm — Kirchstein, Israel, Schiffmiller & Pieroni, P.C.

(57) ABSTRACT

A platinum core-shell catalyst that uses palladium (Pd) as a core metal, or a platinum catalyst containing platinum and a metal besides platinum is manufactured industrially on a (Continued)

Structural change of Pt/Pd/C catalyst due to ADT mass scale. The platinum catalyst is supported on carbon and has excellent oxygen reduction activity. The platinum catalyst is made for a fuel cell by bringing about the presence of a chemical species imparting higher potential than the initial oxide formation potential of the platinum of the platinum catalyst, and by bringing about the presence of a chemical species imparting lower potential than the initial oxide formation potential of the platinum of the platinum catalyst. The manufacture is carried out in a dispersion solution of the platinum catalyst dispersed in an acidic solution containing protons.

11 Claims, 8 Drawing Sheets

(51) Int. Cl.
*B01J 37/14* (2006.01)
*B01J 37/18* (2006.01)
*H01M 4/88* (2006.01)
*H01M 4/92* (2006.01)
*H01M 8/1018* (2016.01)

(56) References Cited

U.S. PATENT DOCUMENTS

| | | | | |
|---|---|---|---|---|
| 7,955,755 | B2* | 6/2011 | McGrath | H01M 4/8652 252/506 |
| 8,304,365 | B2* | 11/2012 | Shao | B01J 23/42 429/400 |
| 8,691,717 | B2* | 4/2014 | Lopez | B22F 1/0018 428/403 |
| 8,871,672 | B2* | 10/2014 | Goto | H01M 4/8657 429/400 |
| 8,921,260 | B2* | 12/2014 | Shao | H01M 4/921 429/487 |
| 9,005,331 | B2* | 4/2015 | Adzic | B82Y 30/00 502/101 |
| 9,203,095 | B2* | 12/2015 | Roh | H01M 4/926 |
| 9,246,176 | B2* | 1/2016 | Shao | H01M 4/921 |
| 9,385,377 | B2* | 7/2016 | Kaneko | H01M 4/8657 |
| 9,601,782 | B2* | 3/2017 | Murata | C25D 7/006 |
| 9,623,481 | B2* | 4/2017 | Wong | B22F 1/0025 |
| 9,853,255 | B2* | 12/2017 | Adzic | H01M 4/8657 |
| 9,882,222 | B2* | 1/2018 | Kuttiyiel | H01M 4/92 |
| 10,243,218 | B2* | 3/2019 | Iio | H01M 4/92 |
| 10,256,475 | B2* | 4/2019 | Nagamori | H01M 4/86 |
| 10,431,831 | B2* | 10/2019 | Sakai | B01J 21/18 |
| 2014/0178575 | A1* | 6/2014 | Iio | H01M 4/92 427/115 |
| 2014/0200133 | A1* | 7/2014 | Kimura | B22F 1/0018 502/339 |
| 2014/0329671 | A1* | 11/2014 | Kim | H01M 4/9041 502/326 |
| 2015/0037711 | A1* | 2/2015 | Cho | B22F 1/025 429/523 |
| 2015/0093682 | A1* | 4/2015 | Kimura | H01M 4/8817 429/487 |
| 2015/0318560 | A1* | 11/2015 | Kaneko | H01M 4/8657 502/5 |
| 2016/0079607 | A1* | 3/2016 | Kaneko | H01M 4/925 429/465 |
| 2016/0126560 | A1* | 5/2016 | Maruyama | H01M 4/8657 429/523 |
| 2018/0069207 | A1* | 3/2018 | Adzic | H01M 4/8657 |

FOREIGN PATENT DOCUMENTS

| | | |
|---|---|---|
| JP | 2014-239033 | 12/2014 |
| JP | 2015-000398 | 1/2015 |
| JP | 2015-017317 | 1/2015 |
| WO | 2012105107 | 8/2012 |
| WO | 2014073114 | 5/2014 |
| WO | 2015098181 | 7/2015 |

OTHER PUBLICATIONS

Zhang, et al., Controlling the Catalytic Activity of Platinum-Monolayer Electrocatalysts for Oxygen Reduction with Different Substrates, Angew. Chem. Int. Ed., vol. 44, pp. 2132-2135, 2005.
Sasaki, et al., Core Protected Platinum Monolayer Shell High-Stability Electrocatalysts for Fuel-Cell Cathodes, Angew. Chem. Int. Ed., vol. 49, pp. 8602-8607, 2010.
International Search Report in PCT/JP2016/057170, dated Jun. 2, 2016.
Yuan Wang, et al.,: "Preparation of Pd—Pt Bimetallic Colloids with Controllable Core/Shell Structures", The Journal of Physical Chemistry B, vol. 101, No. 27, pp. 5301-5306, Jul. 1, 1997 (Jul. 1, 1997).
European Search Report in corresponding European Patent Application No. 16761752.1 dated Aug. 8, 2018.

* cited by examiner

Structural change of Pt/Pd/C catalyst due to ADT

Change in Pt-Pt bond distance
before and after ADT by in-situ XAFS

Pt/Pd/C catalyst after preparation    Pt/Pd/C catalyst after ADT
Morphological change of Pt/Pd/C catalyst due to ADT CV change of Pd/C core and Pt/C catalyst due to ADT Potential change of Pt/Pd/C catalyst according to the present invention Comparative Example 1

Reference Example 1

Example 1

Morphorogy of Pt/Pd/C catalyst

Potential measurement result of Cu sheet

METHOD FOR MANUFACTURING PLATINUM CATALYST, AND FUEL CELL INCLUDING THE SAME

TECHNICAL FIELD

The present invention relates to a method for manufacturing a platinum catalyst suitable for use as a catalyst for an oxygen reduction reaction in a fuel cell, and a fuel cell including the catalyst.

BACKGROUND ART

A polymer electrolyte fuel cell (PEFC) is a clean energy device that generates only water by causing an oxidation reaction of hydrogen on the anode and a reduction reaction of oxygen on the cathode. Polymer electrolyte fuel cells including platinum (Pt) as a cathode catalyst are known. Catalysts containing platinum, which is a noble metal, have advantages that they have high catalytic activity and electrical conductivity, and that they are not susceptible to corrosion and poisoning by the circumstances of the surrounding environment or substances present in the surrounding environment.

Meanwhile, there is a problem that the platinum resource is scarce and costly, and various studies are under way to improve the utilization efficiency and durability of platinum to reduce the used amount thereof. As one of such studies, a platinum core-shell catalyst obtained by covering a dissimilar metal with platinum is attracting attention. The platinum core-shell catalyst was devised focusing on the fact that only the platinum atoms exposed on the outermost layer of the catalyst particles exhibit catalytic activity, and has a structure in which fine particles of a dissimilar metal (core) covered with a platinum atomic layer (shell) are highly dispersed and supported on a support such as carbon.

As one of core metals of the platinum core-shell catalyst, palladium (Pd) is known. Non-Patent Documents 1 and 2 disclose that use of Pd as a core metal increases the oxygen reduction reaction (ORR) activity in a PEFC. Since the lattice constant of Pd (0.38898 nm) is smaller than that of Pt (0.39231 nm), small compressive stress is generated in the Pt shell provided on the Pd core. It is believed that this compressive stress realizes a situation where the oxygen reduction reaction is likely to proceed on the Pt shell surface to increase the ORR activity.

The Pd core-Pt shell structured catalyst has a problem in its durability since the standard redox potential of Pd (0.92 V vs. NHE) is lower than that of Pt (1.19 V vs. NHE), although the ORR activity of the catalyst is improved as described above. In Non-Patent Document 3, it is reported that in the PEFC using a carbon supported Pd core-Pt shell structured cathode catalyst (hereinafter, sometimes referred to as a Pt/Pd/C catalyst), the Pd core is partially oxidized and dissolved by power generation and that metallic Pd is re-precipitated in the solid polymer electrolyte membrane, forming a Pd band.

Although the present inventors have already found that the oxidative dissolution of the Pd core are problem from the viewpoint of durability of the catalyst, the oxidative dissolution of the Pd core causes changes in the particle size and morphology of the Pt/Pd/C catalyst, which enhances the ORR activity. Patent Document 1 discloses that an accelerated durability test (ADT) enhances the ORR activity of the Pt/Pd/C catalyst. Patent Document 1 also discloses that the ORR activity of the Pt/Pd/C catalyst can be enhanced by repeatedly applying a potential higher than the onset potential for Pt oxide reduction and a potential lower than the onset potential for formation of Pt oxide to the Pt/Pd/C catalyst.

In the specific potential application method disclosed in Patent Document 1, a platinum core-shell catalyst is dispersed in an acidic solution containing protons, and stirred under oxygen supply with coexistence of a metal having a lower redox potential than the onset potential for formation of Pt oxide. This method is an entirely novel technique and has a certain effect, but further enhancement in the ORR activity is required.

Meanwhile, Patent Document 2 discloses a platinum alloy catalyst and a method for manufacturing the platinum alloy catalyst. The manufacturing method disclosed in Patent Document 2 includes the steps of pressurizing and heating a mixed solution, which is obtained by dispersing an organometallic complex of platinum and a metal chloride in an organic solvent and then adding a reducing agent thereto, to synthesize platinum alloy nanoparticles having a size of 2 nm or less, and heating (annealing) the platinum alloy nanoparticles at a temperature of 300° C. or more and 1000° C. or less in a vacuum to adjust the diameter to 2 nm or more and 100 nm or less. It is believed that in the invention of Patent Document 2, platinum alloy particles having a specific crystal form can be obtained by synthesizing platinum alloy nanoparticles and then heating (annealing) the platinum alloy nanoparticles to adjust the particle size of the platinum alloy nanoparticles to 2 nm or more and 100 nm or less.

PRIOR ART DOCUMENTS

Patent Documents

Patent Document JP-A-2015-398
Patent Document 2: JP-A-2015-17317

Non-Patent Documents

Non-Patent Document 1: J. Zhang et al., J. Phys. Chem. B, 108, 10955 (2004)
Non-Patent Document 2: J. Zhang et al., Angew. Chem., Int. Ed., 44, 2132 (2005)
Non-Patent Document 3: K. Sasaki et al., Angew. Chem. Int. Ed., 49, 8602 (2010)

SUMMARY OF THE INVENTION

Problems to be Solved by the Invention

An object of the present invention is to provide a carbon supported platinum catalyst containing platinum and a non-platinum metal in combination and having an excellent ORR activity, and a manufacturing method for obtaining such a catalyst.

Means for Solving the Problems

The present inventors focused on the fact that the ORR mass activity (MA, the ORR activity per unit mass of Pt) is represented by the product of the ORR specific activity (SA, the ORR activity per unit area) and the electrochemical surface area (ECSA), and thought that it is possible to further enhance the ORR mass activity by increasing both the SA and the ECSA. The present inventors found that the particles of the platinum core-shell catalyst having been subjected to the ADT are partially agglomerated, and hit upon an idea suppressing the agglomeration of the particles to mitigate the ECSA decay, thereby enhancing the ORR mass activity. The present inventors found through further studies that, at the same total time for a potential cycling, a longer potential holding time per potential cycle and a smaller number of potential cycles enable to maintain the oxidative dissolution of the Pd core and to suppress of the particle agglomeration. Then, the present inventors found that feeding a gas having predetermined characteristics into an acidic solution where a platinum core-shell catalyst is dispersed makes it possible to continuously apply a potential to the catalyst, and such treatment can be industrially realized, and thus completed the present invention.

The present inventors further conducted studies and found that the above-mentioned method is applicable not only to a catalyst having a core-shell structure but also to all platinum catalysts containing platinum and a non-platinum metal, and thus completed the present invention. Herein, catalysts containing platinum as a substance having catalytic activity are collectively referred to as platinum catalysts. Platinum catalysts include both platinum core-shell catalysts and platinum alloy catalysts.

The present inventors further conducted studies, and found that what is important in the above-mentioned method is to continuously apply constant potentials alternately to the platinum catalyst, and the method of applying the potentials is not limited to feeding of a gas. Thus, the present inventors completed the additional present invention. Specifically, the present inventors found, as a method other than the method of feeding a gas, a method of allowing a metal that has a redox potential lower than the onset potential for reduction of the Pt oxide to be present together under an inert gas atmosphere in an acidic solution in which the platinum catalyst is dispersed.

That is, the present invention relates to:

[1] A method for manufacturing a platinum catalyst for fuel cells that contains platinum and a non-platinum metal, including the steps of:

(I) allowing a chemical species that applies a potential higher than onset potential of Pt oxide formation to be present; and (II) allowing a chemical species that applies a potential lower than onset potential of reduction of Pt oxide to be present in a dispersion solution including the platinum catalyst dispersed in an acidic solution containing protons.

The present invention also relates to:

[2] The manufacturing method according to [1], wherein steps (I) and (II) are carried out alternately a plurality of times;

[3] The manufacturing method according to [I] or [2], wherein steps (I) and (II) are each carried out for a predetermined duration; and

[4] The manufacturing method according to [3], wherein the predetermined duration is within the range of 1 to 30 minutes.

The present invention also relates to:

[5] The manufacturing method according to any one of [1] to [4], wherein steps (I) and (II) are each a step of allowing a gas and/or a solid to be present in the dispersion solution.

The present invention also relates to:

[6] The manufacturing method according to any one of [1] to [4], wherein step (I) is (A) a step of feeding a gas that applies a potential higher than the onset potential of Pt oxide formation in the platinum catalyst, and step (II) is (B-1) a step of feeding a gas that applies a potential lower than the onset potential of reduction of Pt oxide in the platinum catalyst.

The present invention also relates to:

[7] The manufacturing method according to [6], wherein in step (B-4), the gas that applies a potential lower than the onset potential of reduction of Pt oxide is hydrogen.

The present invention also relates to:

[8] The manufacturing method according to any one of [1] to [4], wherein step (I) is (A) a step of feeding a gas that applies a potential higher than the onset potential of Pt oxide formation in the platinum catalyst, and step (II) is (B-2) a step of feeding an inert gas while allowing a solid that applies a potential lower than the onset potential of reduction of Pt oxide in the platinum catalyst to be present in the dispersion solution.

The present invention also relates to:

[9] The manufacturing method according to [8], wherein in step (B-2), the solid that applies a potential lower than the onset potential of reduction of Pt oxide is copper, and the inert gas is nitrogen gas or argon gas.

The present invention also relates to:

[10] The manufacturing method according to any one of [6] to [9], wherein in step (A), the gas that applies a potential higher than the onset potential of Pt oxide formation is a gas containing oxygen;

[11] The manufacturing method according to any one of [1] to [10], wherein the acidic solution containing protons is a sulfuric acid solution; and

[12] The manufacturing method according to any one of [1] to [11], further including, between step (I) and step (II), the step of: (III) feeding an inert gas.

The present invention also relates to:

[13] The manufacturing method according to any one of [1] to [12], wherein the platinum catalyst is a platinum core-shell catalyst having palladium-containing core particles and platinum shells formed on surfaces of the core particles; and

[14] The manufacturing method according to any one of [1] to [12], wherein the platinum catalyst is a platinum alloy catalyst of platinum and palladium, cobalt, nickel, iron or copper.

The present invention also relates to:

[15] A platinum catalyst manufactured by the method according to any one of [1] to [14]; and

[16] A fuel cell including a platinum catalyst manufactured by the method according to any one of [1] to [14] as a catalyst for an oxygen reduction reaction.

The present invention also relates to:

[17] A method for improving ORR activity of a platinum catalyst for fuel cells, including dispersing a platinum catalyst in an acidic solution, and repeatedly carrying out the following steps in order a plurality of times:

(1) a step of feeding an inert gas into a platinum catalyst dispersion solution, (2) a step of feeding hydrogen into the platinum catalyst dispersion solution, (3) a step of feeding an inert gas into the platinum catalyst dispersion solution, and (4) a step of feeding oxygen into the platinum catalyst dispersion solution.

The present invention also relates to:

[18] A method for improving ORR activity of a platinum catalyst for fuel cells, including dispersing a platinum catalyst in an acidic solution, and repeatedly carrying out the following steps in order a plurality of times:

(101) a step of feeding an inert gas into a platinum catalyst dispersion solution, (102) a step of allowing solid copper to be present in the platinum catalyst dispersion solution while feeding an inert gas into the platinum catalyst dispersion solution, (103) a step of removing the solid copper of step (102) from the platinum catalyst dispersion solution, and (104) a step of feeding oxygen into the platinum catalyst dispersion solution.

Effect of the Invention

According to the present invention, a platinum catalyst having high oxygen reduction reaction activity per unit mass of platinum (ORR mass activity: MA) can be obtained by treatment through a method capable of mass production on an industrial scale. Since the platinum catalyst of the present invention has high ORR activity per unit mass of platinum, it is possible to reduce the platinum usage, which is advantageous in terms of cost reduction and environment.

MODE FOR CARRYING OUT THE INVENTION

First, the present invention relates to a method for manufacturing a platinum catalyst. The manufacturing method of the present invention includes a step of repeatedly applying predetermined potentials to a platinum catalyst by repeatedly feeding, over a predetermined duration, a plurality of chemical species alternately into an acidic solution in which the platinum catalyst is dispersed. This step is a post-treatment step in the manufacture of the platinum catalyst and is a step for enhancement of the ORR activity of the catalyst. Through this step, part of a dissimilar metal (palladium, cobalt, nickel, iron, copper or the like) having a redox potential lower than that of platinum is oxidatively dissolved, platinum atoms are rearranged in the surfaces of the catalyst particles, and the agglomeration of the catalyst particles is suppressed. As a result, it is believed that ORR specific activity (SA) of the catalyst is enhanced, decay of electro-chemical surface area (ECSA) of the catalyst is mitigated, and thus a catalyst with high ORR mass activity can be obtained.

It has been found in the previous study that ORR activity of a Pt/Pd/C catalyst is greatly improved when the catalyst is subjected to an accelerated durability test (ADT, condition: 0.6 V (3 s)-1.0 V (3 s) rectangular wave, Ar saturated 0.1 M HClO$_4$ at 80° C., 10,000 cycles).

Analyses of the Pt/Pd/C catalyst revealed that particle morphology changed into a round shape, the average particle size decreased, the Pt shell was thickened, and the core-shell structure was retained after the ADT. According to one example, it was estimated that the particle size of the Pd core decreased from 4.2 nm to 2.5 nm, and the thickness of the Pt shell increased from 1.1 monolayers (MLs) to 2.7 MLs by the ADT.

Figure 1:
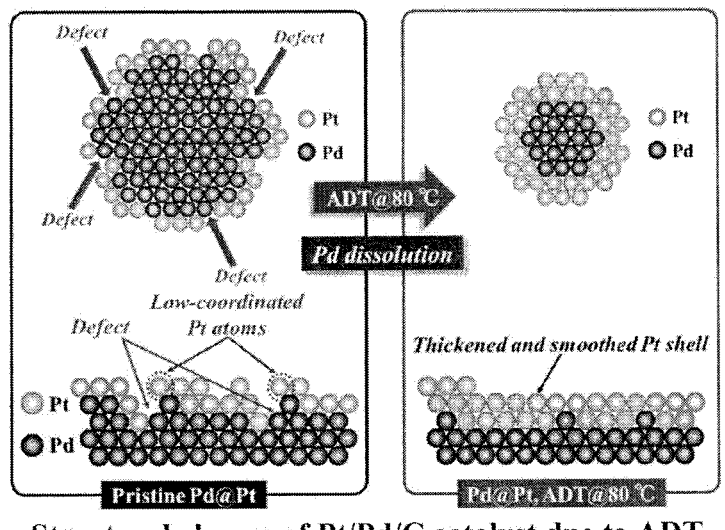
FIG. 1 shows a schematic diagram demonstrating a structural change of platinum atoms in a shell with the ADT.
Figure 2:
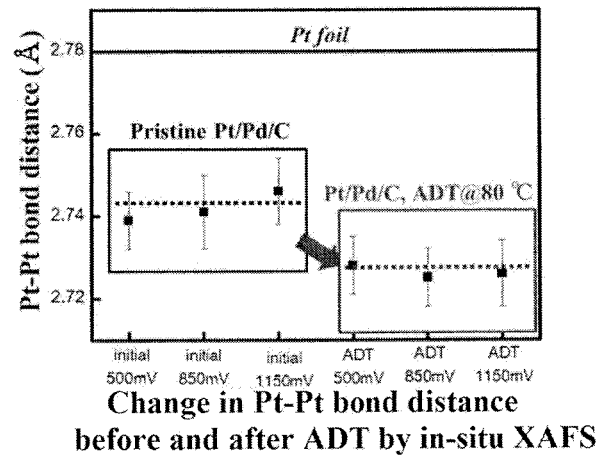
FIG. 2 shows XAFS analysis results of Pt—Pt interatomic distance before and after the ADT.

The cause of improvement in the ORR activity was considered as follows. That is, the platinum shell of the Pt/Pd/C catalyst before the ADT is not perfect and has many defects. When a high potential and a low potential are repeatedly applied during the ADT, the Pd core having a redox potential lower than that of the Pt is oxidatively dissolved through the defects, and simultaneously the Pt atoms are rearranged to form a thicker Pt shell. In this process, it was considered that number of lowly coordinated surface Pt atoms decreased and the shell was thickened and smoothened, which enhanced the ORR activity (see [FIG. 1]). It is well known that the lowly coordinated Pt atoms show low ORR activity (for example, H. A. Gasteiger et al., Appl. Catal. B Environ., 56, 9 (2005). M. Shao et al., Nano Lett., 11, 3714 (2011)). In addition, XAFS analysis revealed that Pt—Pt interatomic distance decreased after the ADT, by which a compressive strain was induced in the Pt shell (see [FIG. 2]). It was considered that the compressive strain changed the electronic state of the Pt shell and enhanced the ORR activity.

Figure 3:
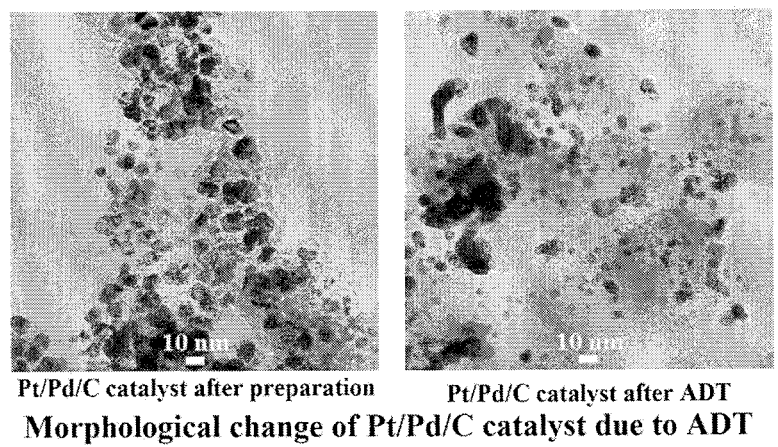
FIG. 3 shows TEM images of a Pt/Pd/C catalyst before and after the ADT.

With careful observation of the TEM images of the Pt/Pd/C catalyst before and after the ADT, in addition to the catalyst particles having round shape individually, some catalyst particles were agglomerated after the ADT (see [FIG. 3]), which decreases ECSA and ORR mass activity of the catalyst. Therefore, the ORR mass activity of the Pt/Pd/C catalyst can be further enhanced by suppressing the particle agglomeration and mitigating the ECSA decay while maintaining the increase of the ORR specific activity.

Figure 4:
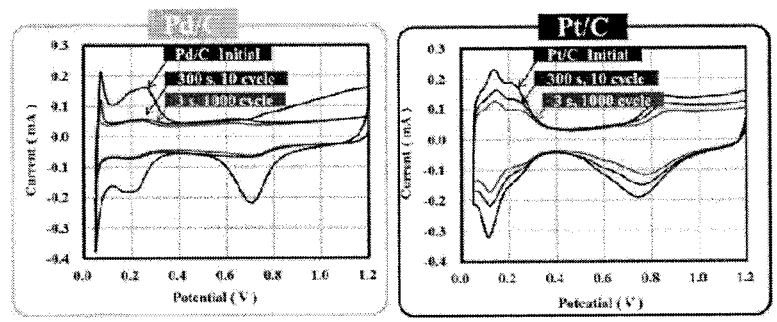
FIG. 4 shows cyclic voltammograms of Pd/C core and Pt/C catalyst at the initial stage, after potential cycles (3 seconds×1,000 times), and after potential cycles (300 seconds×10 times).

As a survey for conditions suppressing the agglomeration of the Pt/Pd/C catalyst particles, the present inventors used a carbon supported Pd nanoparticle core (Pd/C) and a carbon supported platinum catalyst (Pt/C) individually to study what kind of potential cycling protocol can realize the above-mentioned change. More specifically, at the same total potential holding time, the present inventors compared a condition where a rectangular wave of 0.6 V (3 s)-1.0 V (3 s) for 1,000 cycles with a condition where a rectangular wave of 0.6 V (300 s)-1.0 V (300 s) for 10 cycles. In both cases, ECSAs of the Pd/C cores, which were calculated from hydrogen desorption wave in a potential range of 0.05 V to 0.4 V in CV, decreased to the same extent, and it was found that the oxidative dissolution of the Pd core do not largely depend on the cycle number. On the other hand, it was found that ECSA of the Pt/C decreased with increase in the potential cycle number (see [FIG. 4]). Therefore, these results imply that a longer potential holding time per cycle and a smaller number of potential cycles suppress the agglomeration of catalyst particles and mitigate the ECSA decay with maintaining the oxidative dissolution of the Pd core, which enhances the ORR mass activity of the Pt/Pd/C catalyst.

However, since the above-mentioned experiments were conducted on a glassy carbon (GC) electrode with 6 mm in diameter under precise potential control using a potentiostat. Thus, a new process suitable for a mass production of highly active catalyst is required.

The present inventors have already developed a method that is capable of repeatedly applying a high potential and a low potential simulating a potential cycle test and is industrially suitable where a platinum core-shell catalyst is dispersed in an acidic solution containing protons and stirred under oxygen supply with coexistence of a metal having a redox potential lower than the onset potential of reduction of Pt oxide (for example, copper in Patent Document 1). In this method, however, a low potential is applied only when the dispersed catalyst particles are in contact with the metal, and a high potential is also applied to the catalyst particles when they are in contact with the oxygen molecules. Therefore, the time during which the high potential or the low potential is applied to the catalyst particles is extremely short, and it is impossible to control the contact time (in other word, potential holding time) and the number of contacts (in other word, number of cycles).

In response to this, in the present invention, a step capable of repeatedly applying a high potential and a low potential to a platinum catalyst with controlling the contact time and the number was devised, in which a platinum catalyst is dispersed in an acidic aqueous solution containing protons, and chemical species generating a high potential and a low potential are alternately introduced to the solution.

The manufacturing method of the present invention includes dispersing a platinum catalyst in an acidic solution containing protons, and includes the steps of (I) allowing a chemical species that generates a potential higher than onset potential of Pt oxide formation to be present; and (II) allowing a chemical species that generates a potential lower than onset potential of reduction of Pt oxide to be present in the catalyst dispersed solution. Step (I) is typically (A) a step of feeding a gas that generates a potential higher than onset potential of Pt oxide formation.

Step (II) is typically (B-1) a step of feeding a gas that generates a potential lower than onset potential of reduction of Pt oxide or (B-2) a step of feeding an inert gas while allowing a solid that generates a potential lower than onset potential of reduction of Pt oxide to be present in the catalyst dispersed solution.

Herein, a method including step (A) and step (B-1) is sometimes referred to as a "gas-gas method", and a method including step (A) and step (B-2) is sometimes referred to as a "solid-gas method".

The platinum catalyst used in the present invention may be either of a catalyst having a core-shell structure in which the shell is platinum and the core is a non-platinum metal such as palladium (a platinum core-shell catalyst), and a platinum alloy catalyst containing an alloy of platinum and a non-platinum metal. Herein, catalysts containing platinum as a substance having catalytic activity are collectively referred to as platinum catalysts. Platinum catalysts include both platinum core-shell catalysts and platinum alloy catalysts.

Examples of the acidic solution containing protons include nitric add, sulfuric acid, hydrochloric acid, and perchloric acid. From the viewpoint of less influence on the carbon support that supports the catalyst particles and less influence on platinum, sulfuric acid is preferable. The concentration of the acidic solution can be, for example, 10 mM to 3 M, and is not particularly limited. From the viewpoint of the reaction rate and potential control, the concentration can be set to about 2.0 mM to 2.5 M. The acidic solution is usually an aqueous solution, but may contain other solvents and additives if necessary.

The gas used in (A) the step of feeding a gas that generates a potential higher than onset potential of Pt oxide formation is not limited as long as the gas can generate a potential higher than 0.7 V to the platinum catalyst, since the onset potential for the Pt oxide formation is about 0.7 V. Specific examples of the gas include oxygen. The oxygen may be pure oxygen gas, a gas containing oxygen such as air, or a mixed gas of oxygen and inert gases. When oxygen is fed into the solution, a reaction of the following formula (1) occurs in the solution, and a potential of 1.23 V is continuously applied to the platinum catalyst. Due to an overvoltage of the reaction, the actual measured potential may be lower than 1.23 V in some cases.

[Chemical formula 1]

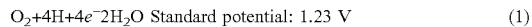

$$O_2+4H^++4e^-\rightarrow 2H_2O \quad \text{Standard potential: } 1.23 \text{ V} \tag{1}$$

in this step, the temperature and the amount of gas to be fed may be appropriately adjusted according to the reaction rate, the amount of the platinum catalyst particles, the oxygen partial pressure in the gas to be fed and the like, and are not particularly limited. For example, the temperature may be 10 to 95° C., and the amount of gas to be fed may be 10 to 1,000 ml/min per 1 L of the solution.

The gas used in (B-1) the step of feeding a gas that generates a potential lower than onset potential of reduction of Pt oxide is not limited as long as the gas can generate a voltage lower than 0.9 V to the platinum catalyst, since the onset potential of reduction of Pt oxide is about 0.9 V. An example of such a gas is hydrogen.

The hydrogen gas may be pure hydrogen gas or a mixed gas of hydrogen and inert gases. When hydrogen gas is fed into the solution, a reaction of the following formula (2) occurs in the solution, and a potential of 0.00 V is continuously applied to the platinum catalyst. Due to an overvoltage of the reaction, the actual measured potential may be higher than 0.00 V in some cases.

[Chemical formula 2]

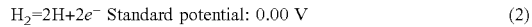

$$H_2=2H^++2e^- \quad \text{Standard potential: } 0.00 \text{ V} \tag{2}$$

In this step, the temperature, the amount of gas to be fed and the feeding time of the gas may be appropriately adjusted according to the reaction rate, the amount of the platinum catalyst particles, the hydrogen partial pressure in the gas to be fed and the like, and are not particularly limited. For example, the temperature may be 10 to 95° C., and the amount of gas to be fed may be 10 to 1,000 ml/min per 1 L of the solution.

The solid used in (B-2) the step of feeding an inert gas while allowing a solid that generates a potential lower than onset potential of reduction of Pt oxide to be present in the catalyst dispersed solution is not limited as long as the solid can apply a potential lower than 0.9 V to the platinum catalyst, since the onset potential of reduction of the Pt oxide is about 0.9 V. Further, from the CV curves shown in FIG. 4, it is understood that reduction of the Pt oxide is almost completed and hydrogen adsorption starts at potential lower than 0.4 V. For this reason, a potential of about 0.4 V is considered to be more preferable for the low limit potential. For example, metallic copper (sometimes simply referred to as "copper") can be suitable for generating such a potential. As the copper, it is preferable to use metallic copper with purity higher than 99.9%. The presence of impurities contaminates the platinum catalyst. Moreover, special attention should be taken for iron impurity since iron impurity (as $Fe^{2+}$) degrades the solid polymer electrolyte membrane during operation of the fuel cell. Further, the shape of the added metallic copper may be any shape such as a plate shape, a sheet shape, a mesh shape, and a granular shape, but it is preferable that the metallic copper has a shape with a large surface area and is capable of being raised quickly from the platinum catalyst dispersed solution (for example, a sheet shape).

It is preferable to feed an inert gas while allowing copper to be present in the platinum catalyst dispersed solution. The inert gas is preferably nitrogen gas or argon gas. By placing the metallic copper in the solution and stirring the solution while feeding an inert gas, a reaction of the following formula (3) occurs in the solution, and a potential of about 0.3 V is continuously applied to the platinum catalyst. Due to an overvoltage in the reaction, the actual measured potential may change from 0.3 V in some cases.

[Chemical formula 3]

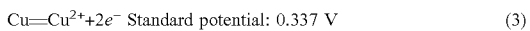

$$Cu = Cu^{2+} + 2e^- \text{ Standard potential: } 0.337 \text{ V} \quad (3)$$

When step (B-2) is adopted, it is preferable that $Cu^{2+}$ ions are contained in the acidic solution having the platinum catalyst. Examples of substances that give $Cu^{2+}$ ions include copper sulfate ($CuSO_4$), copper chloride ($CuCl_2$), copper acetate ($Cu(CH_3COO)_2$), and copper nitrate ($Cu(NO_3)_2$). The $Cu^{2+}$ ions are dissociated and an equilibrium potential represented by the formula (3) is generated by dissolving these Cu salts in water to prepare an aqueous solution with coexistence of the metallic Cu. Although the concentration of $Cu^{2+}$ ions is not particularly limited, it can be, for example, 1 to 1000 mM, and is preferably about 10 to 500 mM from the viewpoint of the reaction rate and stability of the reaction solution.

It is preferable that step (A) and step (B-1) or (B-2) are carried out with stirring. The stirring method is not particularly limited, and can be a conventionally known method.

The durations of step (A) and step (B-1) or (B-2) are each a predetermined duration. For example, the duration can be 30 seconds to 100 minutes, preferably 1 to 60 minutes, more preferably 2 to 30 minutes.

It is preferable that step (A) and step (B-1) or (B-2) are carried out by alternately repeating step (A) and step (B-1) or (B-2) a plurality of times. Although the number of repetitions is not particularly limited, it may be, for example, 10 to 10,000, If the number of repetitions is excessive, the platinum catalyst particles may agglomerate to decrease the ECSA, and thus decrease the ORR mass activity. From the viewpoint of suppressing the agglomeration of the catalyst particles and performing a sufficient reaction, the number of repetitions is preferably 20 to 500. Note that the repetition of step (A) and step (B-1) or (B-2) may be started from either step (A) or step (B). However, in order not to reduce and precipitate metal cations resulting from oxidative dissolution into the acidic solution at the end of the step, the process is preferably ended with (A) the step of feeding a gas that generates a potential higher than onset potential of Pt oxide formation.

The manufacturing method including step (A) and step (B-1) preferably further includes, between step (A) and step (B-1), (C) a step of feeding inert gases. It is also preferable to feed the inert gases to replace the gas in the reaction system before the repetition of step (A) and step (B-1) is started. In particular, when starting the repetition from step (B-1), it is preferable to feed inert gases before step (B-1) is carried out for the first time to degas oxygen in the air in the reaction system. The inert gases are not particularly limited, and examples thereof include argon gas and nitrogen gas. The flow rate and the like of the inert gases may be appropriately selected and is not particularly limited. The duration of feeding the inert gases is not particularly limited, but it is preferable that the gases used in step (A) and step (B-1) are sufficiently replaced with the inert gases.

The manufacturing method including step (A) and step (B-2) also preferably further includes, between step (A) and step (B-2), (C) the step of feeding inert gases. Except during step (B-2), solid copper is removed from the platinum catalyst dispersed solution. In particular, during step (A), solid copper should not be present in the platinum catalyst dispersed solution.

That is, in the manufacturing method including step (A) and step (B-2), the following steps are preferably repeatedly carried out:

(101) a step of feeding inert gases into a platinum catalyst dispersed solution, (102) a step of allowing solid copper to be present in the platinum catalyst dispersed solution while feeding inert gases into the platinum catalyst dispersed solution, (103) a step of removing the solid copper of step (102) from the platinum catalyst dispersed solution, and (104) a step of feeding oxygen into the platinum catalyst dispersed solution.

It is also preferable to feed inert gases to replace the gas in the reaction system before the repetition of step (A) and step (B-2) are started. In particular, when starting the repetition from step (B-2), it is preferable to feed inert gases prior to step (B-2) carried out for the first time to degas oxygen in the air in the reaction system. The inert gases are not particularly limited, and examples thereof include argon gas and nitrogen gas as described above. The flow rate and the like of the inert gases may be appropriately selected and are not particularly limited. The duration of feeding the inert gases is not particularly limited as long as oxygen in the system is sufficiently replaced with the inert gases.

The platinum catalyst to be subjected to the above-mentioned steps may be a conventionally known platinum catalyst, and is preferably a platinum core-shell catalyst or a platinum alloy catalyst. In the case of a platinum core-shell catalyst, the method for producing the core and/or shell is not particularly limited. The platinum core-shell catalyst to be subjected to the above-mentioned steps may be produced immediately before being subjected to the above-mentioned steps, or the above-mentioned steps may be carried out as a finishing step or a post-treatment step for a preliminarily produced platinum core-shell catalyst.

The platinum core-shell catalyst to be subjected to the manufacturing process of the present invention is not particularly limited, and the catalyst can be produced by the following production method, for example.

That is, Pd core particles supported on a carbon support can be synthesized by a known synthetic method. As an example, it is possible to employ a method of obtaining a carbon supported Pd nanoparticle core by allowing a carbon support to be present together in an aqueous solution or an organic solution of palladium chloride ($PdCl_2$), palladium nitrate ($Pd(NO_3)_2$), palladium acetate ($Pd(CH_3COO)_2$), palladium(II) sodium chloride trihydrate ($Na[PdCl_4]\cdot 3H_2O$), or diammine dinitro palladium(II) ($[Pd(NH_3)_2(NO_2)_2]$), or a mixed solution thereof, and reducing the palladium ions.

For the formation of the Pt shell, it is preferable to use a modified Cu-UPD method which does not require precise potential control using an external power source and does not require a counter electrode or a reference electrode. In the modified Cu-UPD method, a Pd/C core is dispersed into an acidic aqueous solution containing $Cu^{2+}$ ions with coexistence of metallic Cu, and stirred in inert gases atmosphere such as argon or nitrogen to form Cu monolayer on the Pd core surface. The Cu layer is not necessarily a uniform film composed entirely of monolayer, and may be partially defective and multilayered.

The solid metallic Cu used in the modified Cu-UPD method is not limited as long as it is an object at least the surface of which is made of Cu, and which is ionized and produces $Cu^{2+}$ ions when it comes into contact with Pd nanoparticles. Examples of the solid include a Cu mesh, a Cu wire, Cu particles, a Cu plate, and a Cu block.

The substance that gives $Cu^{2+}$ ions that is used in an acidic aqueous solution containing Cu ions may be copper sulfate ($CuSO_4$), copper chloride ($CuCl_2$), copper acetate ($Cu(CH_3COO)_2$), copper nitrate ($Cu(NO_3)_2$) or the like. $Cu^{2+}$ ions are dissociated by dissolving these Cu salts in water to prepare an aqueous solution. Although the concentration of $Cu^{2+}$ ions is not particularly limited, it can be, for example, 0.1 to 100 mM, and is preferably about 1 to 50 mM from the viewpoint of the reaction rate and stability of the reaction solution.

The acid that gives the acidic solution is not particularly limited as long as the acid can dissolve Cu, and examples thereof include nitric acid, sulfuric acid, hydrochloric acid, and perchloric acid. The concentration of the acid can be 10 mM to 1 M, and can be set to about 20 mM to 0.5 M from the viewpoint of the reaction rate and potential control of the Cu solid.

A Cu monolayer is formed on the Pd core surface by dispersing the Pd/C core into an acidic aqueous solution containing the $Cu^{2+}$ ions with coexistence of the solid Cu, and stirring the solution under inert gases at 5 to 30° C. for 1 to 50 hours.

Subsequently, the Cu monolayer formed on the Pd core surface is displaced with Pt. This step can be carried out by known displacement plating. Examples of the substance that gives Pt ions include platinic acid salts ($K_2PtCl_4$ and $K_2PtBr_4$), tetraammineplatinum(II) nitrate ($Pt(NH_3)_4(NO_3)_2$), tetraammineplatinum(II) hydroxide ($Pt(NH_3)_4(OH)_2$), tetraammineplatinum(II) chloride ($Pt(NH_3)_4Cl_2$), bis(ethylenediamine) platinum(II) chloride ($[Pt(NH_2CH_2CH_2NH_2)_2]Cl_2$), and diammine dinitro platinum (II) ($Pt(NH_3)_2(NO_2)_2$).

The step of displacing the Cu monolayer with the Pt shell can be carried out by removing the Cu solid from the $Cu^{2+}$ ions containing acidic solution in which the Cu solid is immersed, and then adding the above-mentioned compounds containing Pt to the aqueous solution and stirring the solution. The Pt compounds are preferably added after removal of the Cu solid as immediately as possible. When oxygen in air enters the solution during the operation, the Cu monolayer formed on the Pd core surface is oxidized and dissolved. Thus, it is preferable to immediately add the platinum compounds after removing the Cu solid. The reaction time and temperature can be appropriately selected, and are, for example, 1 minute to 50 hours, more preferably 1 minute to 1 hour at 5 to 30° C., and the reaction is preferably carried out with stirring under inert gases.

The platinum core-shell catalyst obtained by the above-mentioned method is optionally washed and dried by a known method. In addition to the above-mentioned steps, the method may optionally include steps such as separation, purification, and washing.

Subsequently, the obtained catalyst is subjected to the above-mentioned step (catalytic activity improvement treatment step) which is a characteristic feature of the present invention to obtain the platinum core-shell catalyst of the present invention.

The Pd core particles of the platinum core-shell catalyst obtained by the manufacturing method of the present invention may contain elements other than Pd, for example, metals such as silver, copper, and nickel. The Pd core particles may also contain other substances as long as such substances do not affect the effect of the present invention, and may also contain a residue or part of additives (such as a reducing agent and a stabilizing agent) used in the manufacturing process.

The particle size of the Pd core particles of the platinum core-shell catalyst obtained by the manufacturing method of the present invention is suitably 3.0 to 7.0 nm. When Pd core particles having a particle size less than 3.0 nm are used, the platinum core-shell catalyst has a small particle size, and the platinum core-shell catalyst particles tend to agglomerate due to potential cycling. On the other hand, when the particle size exceeds 7.0 nm, the platinum core-shell catalyst has a large particle size, the catalyst particles become porous due to potential cycling, and the ORR activity does not increase. The particle size of the Pd core particles means the average particle size obtained from a TEM image or a value calculated by applying the Scherrer's equation to the X-ray diffraction peak of the (220) plane of Pd.

The Pt shell of the platinum core-shell catalyst obtained by the manufacturing method of the present invention is preferably monolayer (1 ML equivalent) to three monolayers (3 MLs equivalent), that is, the average thickness of the Pt shell is about 0.3 to 0.9 nm. Only Pt atoms located at the outermost layer (outermost surface) of the shell can exhibit ORR activity. From the viewpoint of corrosion resistance, the Pt monolayer is considered insufficient. According to the present invention, it is important from the viewpoint of corrosion resistance that Pt shell atoms are rearranged to form a thick film, and the Pt shell thickness corresponding to two monolayers or three monolayers is suitable. In a Pt shell thicker than three monolayers, Pt atoms don't contribute to the ORR increase, leading to decrease in the ORR mass activity. The Pt shell in the platinum core-shell catalyst may be made only of Pt or both Pd and Pt, and may also be a Pt—Pd alloy shell. The Pt shell may also be an alloy shell with a dissimilar metal other than Pd. The dissimilar metal is preferably a metal having a redox potential lower than that of platinum, and examples thereof include silver (Ag), copper (Cu), nickel (Ni) and cobalt (Co).

It is thought that Pd in the core of the platinum core-shell catalyst is oxidized and dissolved, and Pt atoms of the shell are rearranged while repeating oxidation and reduction in the manufacturing process which is a characteristic feature of the present invention. Therefore, it is believed that the Pt/Pd/C catalyst before being subjected to the process of the present invention may have some defects in the Pt shell.

On the other hand, when the platinum catalyst is a platinum alloy catalyst not having a core-shell structure, preferable examples of the dissimilar metals used in combination with platinum include palladium, cobalt, nickel, iron, and copper. More specifically, a carbon supported platinum-palladium alloy catalyst (hereinafter sometimes referred to as a "PtPd/C, catalyst"), a carbon supported platinum-cobalt alloy catalyst (hereinafter sometimes referred to as a "PtCo/C catalyst") and the like can be mentioned.

As a method for producing the platinum alloy catalyst, for example, there is a method of dissolving a platinum salt or complex and a salt or complex of a non-platinum metal (for example, palladium or cobalt) in a solvent and heating the resulting solution in a liquid with a reducing agent to reduce the solution. However, the production method is not particularly limited, and a known method can be used. The platinum alloy catalyst to be used in the present invention may be produced immediately before being subjected to the catalytic activity improvement treatment step, or the above-mentioned steps may be carried out as a finishing step or a post-treatment step for a preliminarily produced platinum alloy catalyst.

It is thought that, by subjecting a platinum alloy catalyst produced by a known method to the catalytic activity improvement treatment which is a characteristic feature of the present invention, dissimilar metal atoms are selectively eluted from the surface of the catalyst in which platinum atoms and dissimilar metal atoms are present together, and platinum atoms present in the catalyst surface are rearranged. In this process, platinum atoms accumulate in the catalyst surface and the number of low-coordinated platinum atoms decreases, so that high ORR mass activity can be obtained.

The platinum catalyst of the present invention is preferably dispersed and supported on the surface of a support made of a carbonaceous material. Examples of the carbonaceous material as the support include carbon black, ketjen black, acetylene black, and carbon nanotubes. From the viewpoint of oxidative degradation of the carbonaceous material, a metal oxide support having high oxidation resistance, such as tin oxide ($SnO_x$) or titanium oxide ($TiO_x$) may be used, and a mixture of the carbonaceous support and the metal oxide support may also be used. The support preferably has a specific surface area of about 10 to 1,000 $m^2/g$. Although the platinum catalyst is thought to be supported on the surface of the support mainly by electrostatic interaction, it is also possible to form a chemical bond between the platinum catalyst and the support for supporting the platinum catalyst in order to more firmly support the platinum catalyst and reduce the falling off of the catalyst from the surface of the support.

Hereinafter, the present invention will be specifically described with reference to examples, but the present invention is not limited to the examples.

EXAMPLES

1. Activity Improvement Treatment by Gas-Gas Method

[Example 1] Pt/Pd/C Core-Shell Catalyst (i) Preparation of Pd/C Core

In 300 ml of pure water, $1.4 \times 10^{-3}$ mol of $Pd(NO_3)_2$ was dissolved. In this aqueous solution, 0.35 g of a carbon support (Ketjen Black EC 300 J, specific surface area: 800 $m^2/g$) was ultrasonically dispersed, and water was evaporated with a hot stirrer. Then, a sample obtained by causing a carbon support to support $Pd(NO_3)_2$ was reduced with hydrogen gas at 400° C. for 1 hour. After the hydrogen reduction treatment, the sample was treated in a nitrogen atmosphere at 300° C. for 1 hour in order to remove hydrogen occluded in the Pd particles, whereby a carbon supported Pd core (Pd/C) was obtained.

(ii) Analysis of Pd/C Core

As a result of observing the prepared Pd/C core with a TEM (JEM-2100 F manufactured by JEOL Ltd.), Pd fine particles supported on the carbon support were observed. As a result of measuring the diameters of 200 Pd core particles in the TEM image, the average particle size was 4.6 nm. In addition, the loading amount of metal Pd was measured by thermogravimetric analysis (Thermo Plus TG-8120 manufactured by Rigaku Corporation), and it was 30.6 wt %.

(iii) Formation of Pt shell on Pd/C Core

In 300 ml of an aqueous solution containing 50 mM $H_2SO_4$ and 10 mM $CuSO_4$, 100 mg of the Pd/C core having a loading amount of 30.6 wt % and a particle size of 4.6 nm was dispersed. Ar was made to flow at a flow rate of 500 ml/min, and a Cu mesh was allowed to be present together in the aqueous solution, followed by stirring at 5° C. for 5 hours to form a Cu shell on the Pd core surface. Then, the Cu mesh was removed from the aqueous solution, an aqueous $K_2PtCl_4$ solution, which had been previously subjected to Ar bubbling to remove dissolved oxygen, was immediately added to a concentration of 2 mM, and the Cu shell layer was substituted with a Pt shell layer to form a Pt/Pd/C core-shell catalyst. The formed Pt/Pd/C core-shell catalyst was separated by filtration, re-dispersed in 300 ml of pure water, stirred for 30 minutes, and separated by filtration. This operation was repeated 3 times to wash the Pt/Pd/C core-shell catalyst. Then, the Pt/Pd/C core-shell catalyst was dried in a 60° C. oven in the air for 6 hours.

(iv) Analysis of Pt/Pd/C Catalyst

The composition of the obtained Pt/Pd/C catalyst was analyzed with an XRF (SEA 1200 VX manufactured by SII NanoTechnology), and as a result, Pt:Pd was 33.5:66.5 (at %). The Pt shell layer thickness calculated from the Pd/C core particle size (4.6 nm) and the XRF compositional analysis was equivalent to 1.3 atomic layers. In addition, as a result of the TEM observation, the average particle size of the Pt/Pd/C catalyst was 5.4 nm.

(v) Activity Improvement Treatment (Gas-Gas Method)

The Pt/Pd/C catalyst prepared as described above was subjected to a catalytic activity improvement treatment. That is, 0.1 g of the Pt/Pd/C catalyst prepared as described above was ultrasonically dispersed for 5 minutes in a separable flask containing 150 ml of a 2 M aqueous sulfuric acid solution, and the separable flask was moved into a thermostatic bath and held at 80° C. While the dispersion was stirred with a magnetic stirrer, argon gas as an inert gas was first flowed at a flow rate of 500 ml/min for 5 minutes, hydrogen gas was flowed at 200 ml/min for 6 minutes, and then argon gas as an inert gas was flowed at a flow rate of 500 ml/min for 5 minutes. Then, oxygen gas was flowed at 200 ml/min for 6 minutes. This cycle was repeated 30 times, and then the Pt/Pd/C catalyst was separated by filtration, re-dispersed in 300 ml of ultrapure water, and stirred for 30 minutes. This operation was repeated for 3 times to wash the Pt/Pd/C catalyst. Then, the Pt/Pd/C catalyst was dried at 60° C. in the air.

The Pt/Pd/C catalyst obtained as described above is designated as Example 1.

[Determination of Potential]

Figure 5:
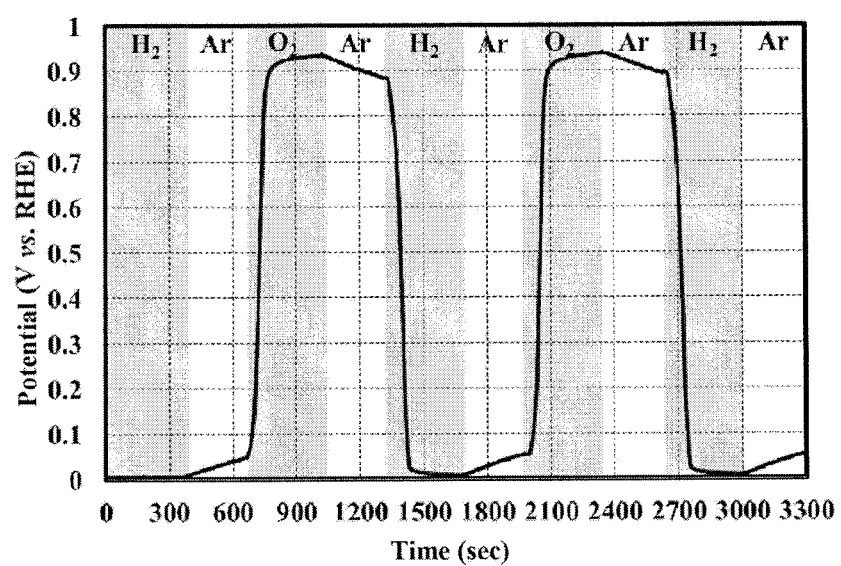
FIG. 5 shows a potential change of a platinum core-shell catalyst dispersed in an acidic solution when hydrogen (6 minutes), argon (5 minutes) and oxygen (6 minutes) were alternately fed in the solution.

A potential change on the Pt/Pd/C catalyst when hydrogen (6 minutes), argon (5 minutes) and oxygen (6 minutes) were alternately fed in the above process step was determined. An alcohol dispersion of the Pt/Pd/C catalyst was coated onto a GC electrode having a diameter of 6 mm and dried, and the GC electrode was immersed in a 2 M aqueous sulfuric acid solution at a temperature of 80° C. Using a reversible hydrogen electrode (RHE) as a reference electrode, the potential change of the Pt/Pd/C catalyst caused by gas feeding was measured. As shown in FIG. 5, when hydrogen gas was fed, the potential of the Pt/Pd/C catalyst was 0.03 V vs. RHE, and when oxygen gas was fed, the potential of the Pt/Pd/C catalyst was 0.93 V vs. RHE. It was confirmed that the present invention enables continuous application of a potential lower than the onset potential of reduction of Pt oxide (0.03 V vs. RHE) and a potential higher than the onset potential of Pt oxide formation (0.93 V vs. RHE).

[Example 2] PtPd/C Alloy Catalyst (i) Preparation of PtPd/C Alloy Catalyst

In 1,000 ml of tert-butylamine, $4.8 \times 10^{-4}$ mol of $Pt(C_5H_7O_2)_2$ (hereinafter, $(C_5H_7O_2)$ is expressed as (acac)) and $1.9 \times 10^{-3}$ mol of $Pd(acac)_2$ were dissolved, and 0.7 g of a carbon support (Vulcan XC-72R, specific surface area: 250 $m^2/g$) was added to the resulting solution and ultrasonically dispersed. After evaporation of tert-butylamine as a solvent with a hot stirrer, reduction with hydrogen gas (15%)/Ar gas (85%) was performed at 600° C. for 4 hours to obtain a PtPd/C alloy catalyst.

(ii) Analysis of PtPd/C Alloy Catalyst

As a result of observing the obtained PtPd/C alloy catalyst with a TEM (JEM-2100 F manufactured by JEOL Ltd.), PtPd fine particles supported on the carbon support were found. As a result of measuring the diameters of 100 PtPd alloy particles, the average particle size was 5.3 nm. The loading amount of metal PtPd was measured by thermogravimetric analysis (Thermo Plus TG-8120 manufactured by Rigaku Corporation), and it was 33.7 wt %. The composition of the PtPd/C catalyst was analyzed with an XRF (SEA 1200 VX manufactured by SII NanoTechnology), and as a result, Pt:Pd was 23.6:76.4 (at %).

(iii) Activity Improvement Treatment (Gas-Gas Method)

The PtPd/C catalyst prepared as described above was subjected to a catalytic activity improvement treatment. That is, 0.1 g of the PtPd/C catalyst prepared as described above was ultrasonically dispersed for 5 minutes in a separable flask containing 150 ml of a 2 M aqueous sulfuric acid solution, and the separable flask was moved into a thermostatic bath and held at 80° C. While the dispersion was stirred with a magnetic stirrer, argon gas as an inert gas was first flowed at a flow rate of 500 ml/min for 5 minutes, hydrogen gas was flowed at 200 ml/min for 6 minutes, and then argon gas as an inert gas was flowed at a flow rate of 500 ml/min for 5 minutes. Then, oxygen gas was flowed at 200 ml/min for 6 minutes. It is considered that a potential lower than the onset potential of reduction of Pt oxide (0.03 V vs. RHE) and a potential higher than the onset potential of Pt oxide formation (0.93 V vs. RHE) can be continuously applied by alternately feeding hydrogen (6 minutes), argon (5 minutes) and oxygen (6 minutes) as in Example 1.

This cycle was repeated for 30 times, and then the PtPd/C catalyst was separated by filtration, re-dispersed in 300 ml of ultrapure water, and stirred for 30 minutes. This operation was repeated for 3 times to wash the PtPd/C catalyst. Then, the PtPd/C catalyst was dried at 60° C. in air.

The PtPd/C catalyst obtained as described above is designated as Example 2,

[Example 3] PtCo/C Alloy Catalyst (i) Preparation of PtCo/C Alloy Catalyst

In 30 ml of oleylamine (OAm), each $0.5 \times 10^{-3}$ mol of $Pt(acac)_2$ and $Co(acac)_2$ were dissolved, and the solution was deaerated for 30 minutes in an $N_2$ atmosphere. Then, the solution was heated to 300° C. with a mantle heater and stirred for 1 hour to reduce the metal ions, whereby PtCo nanoparticles were obtained. The produced PtCo nanoparticles were washed for 3 times with ethanol and hexane and finally re-dispersed in hexane. Then, 300 mg of a carbon support (Ketjen Black EC 300 J, specific surface area: 800 $m^2/g$) was ultrasonically dispersed in 300 ml of hexane, PtCo nanoparticles dispersed in hexane were added to the carbon dispersion, and the mixture was stirred for 12 hours to obtain a carbon supported PtCo alloy catalyst (PtCo/C). In the synthesized PtCo/C alloy catalyst, OAm was chemically bonded to the PtCo nanoparticle surface, and thus the catalyst surface was electrochemically inactive. In order to remove the OAm and transfer the PtCo alloy to an ordered phase, the PtCo/C alloy catalyst was thermally treated at 900° C. for 1 hour in a reductive atmosphere of $H_2$ (1.5%)/Ar (85%). Then, 150 mg of the thermally treated PtCo/C; catalyst was added to a separable flask containing 150 ml of a 1 M aqueous $H_2SO_4$ solution, ultrasonically dispersed, and then stirred at 25° C. in the air for 12 hours. The catalyst was filtered and washed with pure water, and dried in the air. Finally, this sample was thermally treated at 400° C. for 2 hours in a reductive atmosphere of $H_2$ (15%)/Ar (85%).

(ii) Analysis of PtCo/C Alloy Catalyst

The composition of the obtained PtCo/C alloy catalyst was analyzed with an XRF (SEA 1200 VX manufactured by SII NanoTechnology), and as a result, Pt was 51.5:48.5 (at %). As a result of observing the catalyst with a TEM (JEM-2100 F manufactured by JEOL Ltd.), PtCo fine particles supported on the carbon support were found. As a result of measuring the diameters of 100 PtCo alloy particles, the average particle size was 6.3 nm. In addition, the loading amount of metal PtCo was measured by thermogravimetric analysis (Thermo Plus TG 8120 manufactured by Rigaku Corporation), and it was 26.7 wt %.

(iii) Activity Improvement Treatment (Gas-Gas Method)

The PtCo/C catalyst prepared as described above was subjected to a catalytic activity improvement treatment. That is, 0.1 g of the PtCo/C catalyst prepared as described above was ultrasonically dispersed for 5 minutes in a separable flask containing 150 ml of a 2 M aqueous sulfuric acid solution, and the separable flask was moved into a thermostatic bath and held at 80° C. While the dispersion was stirred with a magnetic stirrer, argon gas as an inert gas was first flowed at a flow rate of 500 ml/min for 5 minutes, hydrogen gas was flowed at 200 mil/min for 6 minutes, and then argon gas as an inert gas was flowed at a flow rate of 500 ml/min for 5 minutes. Then, oxygen gas was flowed at 200 ml/min for 6 minutes. It is considered that a potential lower than the onset potential of reduction of Pt oxide (0.03 V vs. RHE) and a potential higher than the onset potential of Pt oxide formation (0.93 V vs. RHE) can be continuously applied by alternately feeding hydrogen (6 minutes), argon (5 minutes) and oxygen (6 minutes) as in Example 1.

This cycle was repeated for 30 times, and then the PtCo/C catalyst was separated by filtration, re-dispersed in 300 ml of ultrapure water, and stirred for 30 minutes. This operation was repeated for 3 times to wash the PtCo/C catalyst. Then, the PtCo/C catalyst was dried at 60° C. in air.

The PtCo/C catalyst obtained as described above is designated as Example 3.

Comparative Example 1

A Pt/Pd/C catalyst was prepared in the same manner as in Example 1 except that the catalytic activity improvement treatment step was not carried out, and the catalyst is designated as Comparative Example 1.

Comparative Example 2

A Pt/Pd/C alloy catalyst was prepared in the same manner as in Example 2 except that the catalytic activity improvement treatment was not carried out, and the catalyst is designated as Comparative Example 2.

Comparative Example 3

A PtCo/C alloy catalyst was prepared in the same manner as in Example 3 except that the catalytic activity improvement treatment was not carried out, and the catalyst is designated as Comparative Example 3.

Reference Example 1

A Pt/Pd/C catalyst to which a potential was applied under the following conditions instead of the catalytic activity improvement treatment step is designated as Reference Example 1.

That is, a suspension was prepared by ultrasonically dispersing a Pt/Pd/C catalyst (without being subjected to a catalytic activity improvement treatment) in n-hexanol. Then, the catalyst was coated onto a GC electrode (diameter: 6 mm) of a rotating ring disk electrode so that the amount of Pt would be 14.1 μg/cm² to prepare a working electrode. The prepared electrode was immersed in a 0.1 M aqueous HClO$_4$ solution at 80° C. saturated with argon gas, and 30 cycles of 0.05 V (300 s) to 1.0 V (300 s) rectangular waves (vs. the reversible hydrogen electrode (RHE)) were applied to the Pt/Pd/C catalyst.

Reference Example 2

A PtPd/C catalyst to which a potential was applied under the following conditions instead of the catalytic activity improvement treatment step is designated as Reference Example 2.

That is, a suspension was prepared by ultrasonically dispersing a PtPd/C catalyst (without being subjected to a catalytic activity improvement treatment) in n-hexanol. Then, the catalyst was applied to a GC electrode (diameter: 6 mm) of a rotating ring disk electrode so that the amount of Pt would be 14.1 μg/cm² to prepare a working electrode. The prepared electrode was immersed in a 0.1 M aqueous HClO$_4$ solution at 80° C. saturated with argon gas, and 30 cycles of 0.05 V (300 s) to 1.0 V (300 s) rectangular waves (vs. the reversible hydrogen electrode (RHE)) were applied to the PtPd/C catalyst.

[Evaluation]

The catalysts of examples, comparative examples and reference examples were evaluated for their morphology and catalytic activity.

[Morphology]

Figure 6:
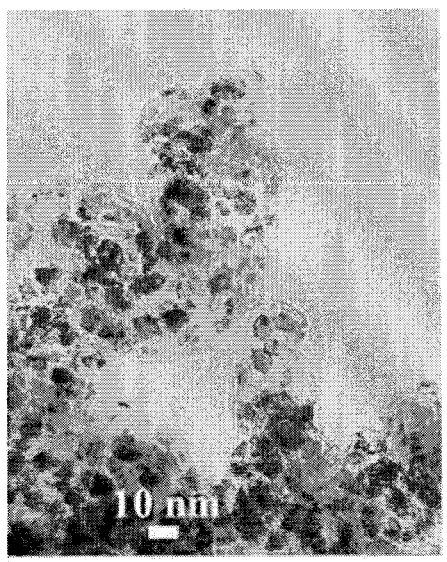
FIG. 6 shows TEM images of the platinum core-shell catalyst of Example 1, Comparative Example 1, or Reference Example 1.
Figure 6:
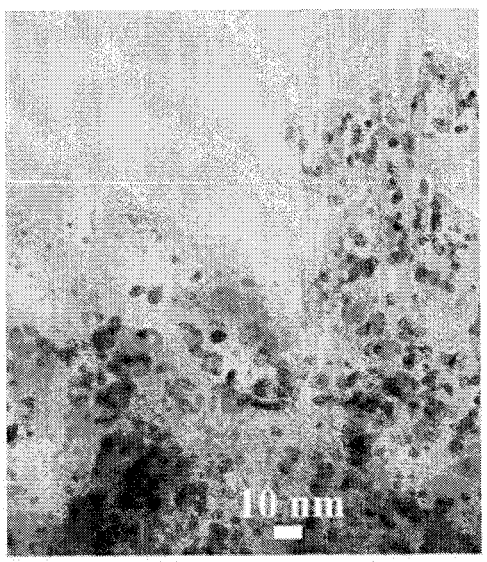
Figure 6:
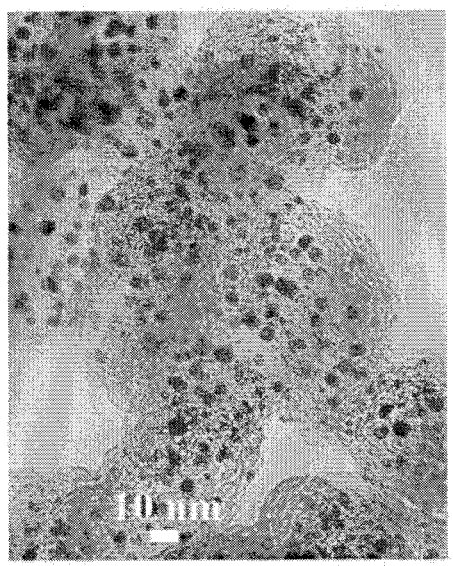

Morphology of the catalyst particles of Example 1, Comparative Example 1 and Reference Example 1 was observed with a TEM. The TEM images are shown in FIG. 6 (Comparative Example 1: upper left column, Reference Example 1: upper right column, Example 1: lower column). As shown in FIG. 6, it was confirmed that in Example 1, the particles of the platinum core-shell catalyst had a round shape and agglomeration of catalyst particles was suppressed. On the other hand, the platinum core-shell catalyst of Comparative Example 1 had an angular shape. In the platinum core-shell catalyst of Reference Example 1, the particles had a round shape and the occurrence of agglomeration was moderate.

[Evaluation of Catalytic Activity]

The ORR activities of the catalysts of Examples 1 to 3, Comparative Examples 1 to 3, and Reference Examples 1 and 2 were evaluated by a rotating disk electrode method. Each catalyst was coated onto a GC electrode (diameter: 6 mm) of a rotating disk electrode so that the amount of Pt would be 14.1 μg/cm² to prepare a working electrode. The prepared working electrode was immersed in a 0.1 M aqueous HClO$_4$ solution at 25° C. saturated with argon gas, and a cyclic voltammogram (CV) was obtained using a reversible hydrogen electrode (RHE) as a reference electrode and a Pt wire as a counter electrode within a potential range of 0.05 V to 1.2 V at a potential sweep rate of 50 mV/s. The electro-chemical surface area (ECSA) of each catalyst was calculated from the hydrogen desorption wave of the obtained CV. Subsequently, the gas was replaced with oxygen gas, and a polarization curve was obtained within a potential range of 0.05 V to 1.0 V at a potential sweep rate of 10 mV/s with the GC electrode being rotated at 1,600 rpm. Using the obtained polarization curve, the kinetic current (ik) was obtained from the oxygen reduction current at 0.9 V and the limiting current at 0.4 V. The ORR specific activity (SA) and ORR mass activity (MA) were calculated by dividing the obtained ik by the ECSA and Pt mass, respectively. The calculated ECSA, ORR specific activity (SA) and ORR mass activity (MA) are shown in Tables 1 to 3 below.

TABLE 1

| ECSA and ORR activity of Pt/Pd/C catalyst | | | |
|---|---|---|---|
| Pt/Pd/C catalyst | ECSA (m²/g-Pt) | SA (μA/cm²) | MA (A/g-Pt) |
| Comparative Example 1 | 121 | 259 | 315 |
| Reference Example 1 | 79 | 618 | 480 |
| Example 1 | 73 | 620 | 460 |

As shown in Table 1, both of Example 1 and Reference Example 1 showed a decrease in electro-chemical surface area (ECSA), but the ECSA decay was suppressed to the same level in Example 1 and Reference Example 1. The ORR specific activity (SA) was more than twice that of Comparative Example 1 in both Example 1 and Reference Example 1. The ORR mass activity (MA) calculated from the product of ECSA and SA was improved to about 1.5 times that of Comparative Example 1 in both Example 1 and Reference Example 1.

Figure 7:
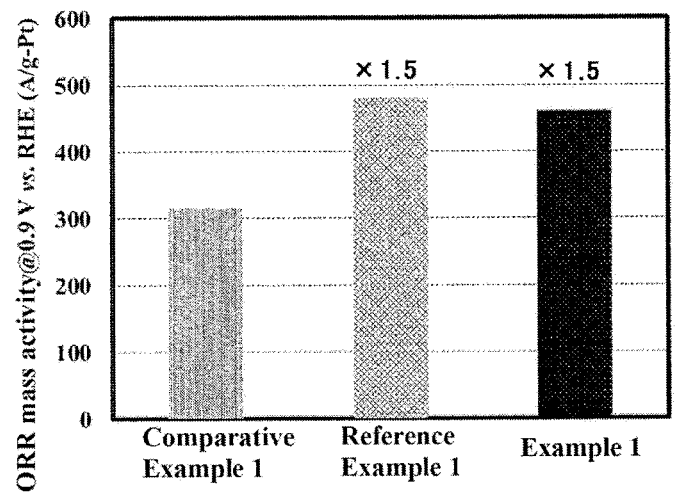
FIG. 7 shows the ORR mass activity of the platinum core-shell catalysts of Example 1, Comparative Example 1 and Reference Example 1.

A comparison graph of ORR mass activity is shown in FIG. 7. As shown in FIG. 7, the Pt/Pd/C catalyst of Example 1 was improved in ORR mass activity to about 1.5 times that of the catalyst of Comparative Example 1. In addition, the Pt/Pd/C catalyst of Example 1 exhibited an ORR mass activity comparable to that of the catalyst of Reference Example 1, The above-mentioned evaluation results demonstrate that the method of the present invention can reproduce the phenomenon of improvement in catalytic activity that occurs in the Pt/Pd/C catalyst by the application of a potential using a GC electrode and potentiostat.

TABLE 2

Electrochemical properties of PtPd/C alloy catalyst

| State of catalyst | Electrochemical surface area ($m^2/g$) | ORR specific activity ($\mu A/cm^2$) | ORR mass activity (A/g) |
| --- | --- | --- | --- |
| Comparative Example 2 | 128 | 486 | 307 |
| Reference Example 2 | 100 | 547 | 577 |
| Example 2 | 63 | 928 | 585 |

As shown in Table 2, both of Example 2 and Reference Example 2 showed a decrease in electro-chemical surface area as compared to Comparative Example 2, but the ORR specific activity in Example 2 was about 1.9 times that in Comparative Example 2. The ORR mass activity calculated from the product of electro-chemical surface area and ORR specific activity was improved to about 1.9 times that of Comparative Example 2 in both Example 2 and Reference Example 2.

Figure 8:
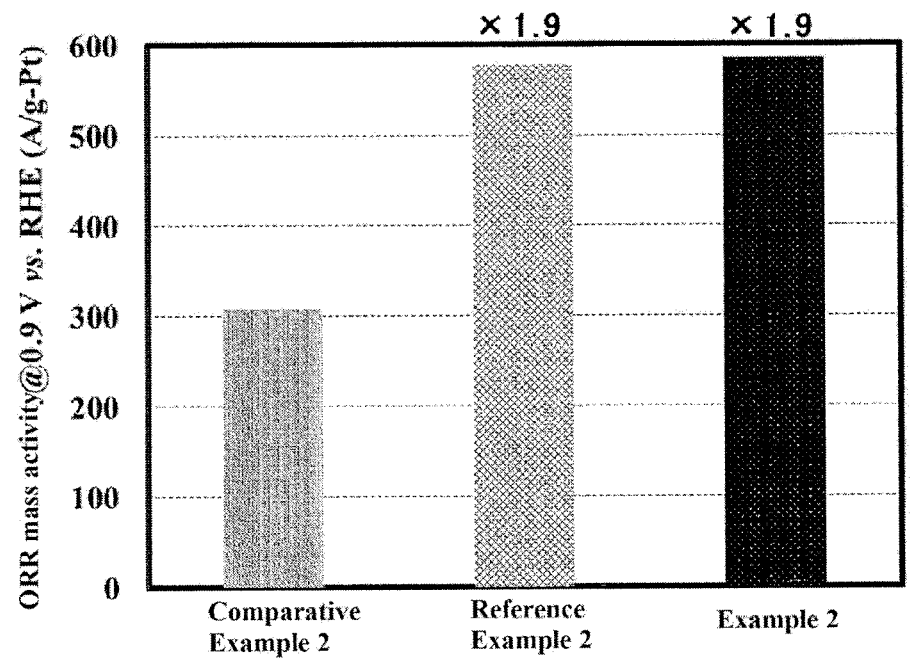
FIG. 8 shows the ORR mass activity of the PtPd/C alloy catalysts of Example 2, Comparative Example 2, and Reference Example 2.

A comparison graph of ORR mass activity is shown in FIG. 8. As shown in FIG. 8, the PtPd/C catalyst of Example 2 was improved in ORR mass activity to about 1.9 times that of the catalyst of Comparative Example 2. In addition, the PtPd/C catalyst of Example 2 exhibited an ORR mass activity comparable to that of the catalyst of Reference Example 2. The above-mentioned evaluation results demonstrate that the method of the present invention can reproduce the phenomenon of improvement in catalytic activity that occurs in the PtPd/C catalyst by the application of a potential using a GC electrode and potentiostat.

TABLE 3

Electrochemical properties of PtCo/C alloy catalyst

| PtCo/C alloy catalyst | ORR mass activity (A/g) |
| --- | --- |
| Comparative Example 3 | 398 |
| Example 3 | 512 |

Figure 9:
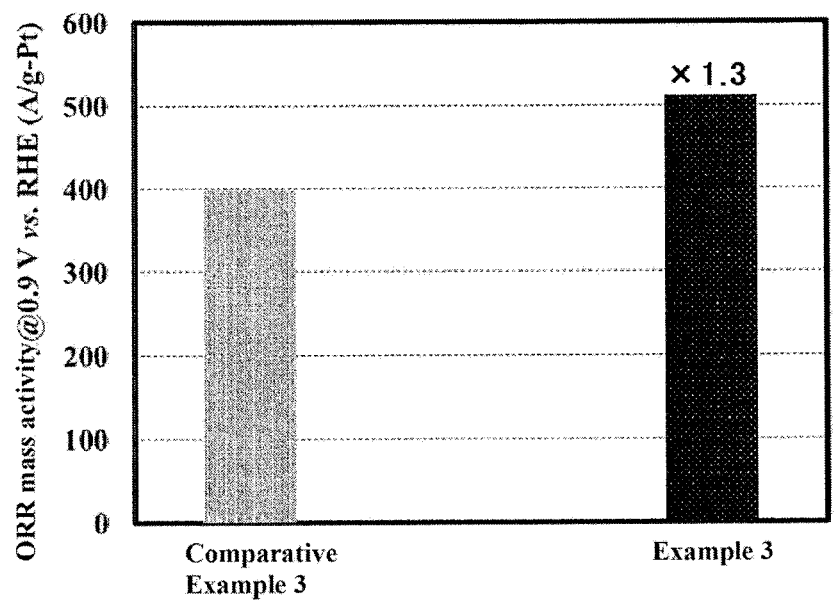
FIG. 9 shows the ORR mass activity of the PtCo/C alloy catalysts of Example 3 and Comparative Example 3.

As shown in Table 3, the ORR mass activity of the PtCo/C alloy catalyst of Example 3 was improved to about 1,3 times that of Comparative Example 3 in which the catalytic activity improvement treatment was not carried out. A comparison graph of ORR mass activity is shown in FIG. 9. As shown in FIG. 9, the PtCo/C catalyst of Example 3 was improved in ORR mass activity to about 1.3 times that of the catalyst of Comparative Example 3.

2. Activity Improvement Treatment by Solid-Gas Method

[Example 4] Pt/Pd/C Core-Shell Catalyst (i) Preparation of Pt/Pd/C Core-Shell Catalyst A Pt/Pd/C catalyst was obtained by the same method as in Example 1 except for the activity improvement treatment. Subsequently, the following activity improvement treatment was carried out.

(ii) Activity Improvement Treatment (Solid-Gas Method)

The prepared Pt/Pd/C catalyst was subjected to a catalytic activity improvement treatment (solid-gas method). That is, 0.2 g of the Pt/Pd/C catalyst prepared as described above was ultrasonically dispersed for 5 minutes in a separable flask containing 800 ml of an aqueous solution containing 2 M sulfuric acid and 0.1 M copper sulfate, and the separable flask was moved into a thermostatic bath and held at 80° C. While the dispersion was stirred with a magnetic stirrer, argon gas as an inert gas was first flowed at a flow rate of 500 ml/min for 20 minutes. Then, while argon gas was flowed at a flow rate of 500 ml/min, a copper sheet was immersed in the solution and held for 5 minutes with stirring. After 5 minutes, the copper sheet was raised and the argon gas was stopped. Then, oxygen gas was flowed at 200 ml/min for 6 minutes. This cycle was repeated for 30 times, and then the Pt/Pd/C catalyst was separated by filtration, re-dispersed in 300 ml of ultrapure water, and stirred for 30 minutes. This operation was repeated for 3 times to wash the Pt/Pd/C; catalyst. Then, the Pt/Pd/C catalyst was dried at 60° C. in air.

The. Pt/Pd/C catalyst obtained as described above is designated as Example 4.

[Determination of Potential]

Figure 10:
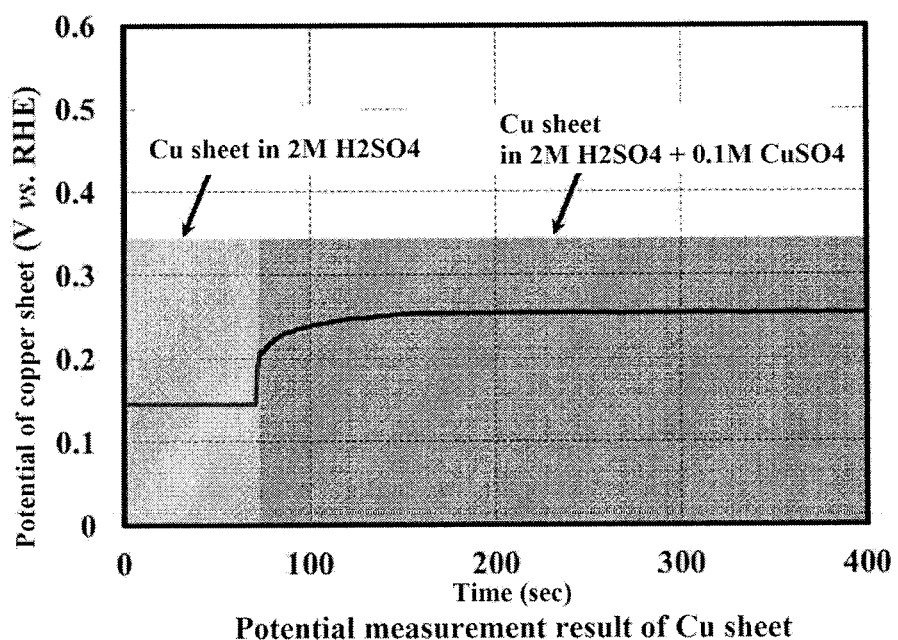
FIG. 10 shows a potential change of a copper sheet when the copper sheet was immersed in an acidic solution under an argon atmosphere and then copper sulfate was added.

In the above process step, argon gas was flowed at a flow rate of 500 ml/min to a 2 M aqueous sulfuric acid solution held at 80° C., a copper sheet was immersed in the solution, and the potential of the copper sheet was measured using a Pt wire as a counter electrode and a reversible hydrogen electrode (RHE) as a reference electrode. The results are shown in FIG. 10. It is understood that the copper sheet has a potential of 0.14 V vs. RHE when being immersed in 2 M sulfuric acid, and the potential of the copper sheet rose to 0.26 V vs. RUE and stabilized when 0.1 M copper sulfate was added. When the copper sheet is removed and oxygen gas is introduced, a potential of 0.93 V vs. RHE, which is the same oxygen potential as in the gas-gas treatment described above, is applied to the Pt/Pd/C catalyst. Therefore, it was confirmed that by the solid-gas method according to the present invention, a potential lower than the onset potential of reduction of Pt oxide (0.26 V vs. RHE) and a potential higher than the onset potential of Pt oxide formation (0.93 V vs. RHE) can be continuously applied.

[Example 5] PtPd/C Alloy Catalyst (i) Preparation of PtPd/C Alloy Catalyst

A PtPd/C catalyst was obtained by the same method as in Example 2 except for the activity improvement treatment.

(ii) Activity Improvement Treatment (Solid-Gas Method)

The prepared PtPd/C alloy catalyst was subjected to a catalytic activity improvement treatment (solid-gas method). That is, 0.2 g of the PtPd/C alloy catalyst prepared as described above was ultrasonically dispersed for 5 minutes in a separable flask containing 800 ml of an aqueous solution containing 2 M sulfuric acid and 0.1 M copper sulfate, and the separable flask was moved into a thermostatic bath and held at 80° C. While the dispersion was stirred with a magnetic stirrer, argon gas as an inert gas was first flowed at a flow rate of 500 ml/min for 20 minutes. Then, while argon gas was flowed at a flow rate of 500 ml/min, a copper sheet was immersed in the solution and held for 5 minutes with stirring. After 5 minutes, the copper sheet was removed and the argon gas was stopped. Then, oxygen gas was flowed at 200 ml/min for 6 minutes. This cycle was repeated 30 times, and then the PtPd/C alloy catalyst was separated by filtration, re-dispersed in 300 ml of ultrapure water, and stirred for 30 minutes. This operation was repeated for 3 times to wash the PtPd/C alloy catalyst. Then, the PtPd/C alloy catalyst was dried at 60° C. in air.

The PtPd/C alloy catalyst obtained as described above is designated as Example 5.

[Example 6] PtCo/C Alloy Catalyst (i) Preparation of PtCo/C Alloy Catalyst

A PtCo/C alloy catalyst was obtained by the same method as in Example 3 except for the activity improvement treatment.

(ii) Activity Improvement Treatment (Solid-Gas Method)

The prepared PtCo/C alloy catalyst was subjected to a catalytic activity improvement treatment (solid-gas method). That is, 0.2 g of the PtCo/C alloy catalyst prepared as described above was ultrasonically dispersed for 5 minutes in a separable flask containing 800 ml of an aqueous solution containing 2 M sulfuric acid and 0.1 M copper sulfate, and the separable flask was moved into a thermostatic bath and held at 80° C. While the dispersion was stirred with a magnetic stirrer, argon gas as an inert gas was first flowed at a flow rate of 500 ml/min for 20 minutes. Then, while argon gas was flowed at a flow rate of 500 ml/min, a copper sheet was immersed in the solution and held for 5 minutes with stirring. After 5 minutes, the copper sheet was removed and the argon gas was stopped. Then, oxygen gas was flowed at 200 ml/min for 6 minutes. This cycle was repeated for 30 times, and then the PtCo/C alloy catalyst was separated by filtration, re-dispersed in 300 ml of ultrapure water, and stirred for 30 minutes. This operation was repeated for 3 times to wash the PtCo/C alloy catalyst. Then, the PtCo/C alloy catalyst was dried at 60° C. in air.

The PtCo/C alloy catalyst obtained as described above is designated as Example 6.

Comparative Example 4

A Pt/Pd/C catalyst was prepared in the same manner as in Example 4 except that the catalytic activity improvement treatment step was not carried out, and the catalyst is designated as Comparative Example 4.

Comparative Example 5

A PtPd/C alloy catalyst was prepared in the same manner as in Example 5 except that the catalytic activity improvement treatment was not carried out, and the catalyst is designated as Comparative Example 5.

Comparative Example 6

A PtCo/C alloy catalyst was prepared in the same manner as in Example 6 except that the catalytic activity improvement treatment was not carried out, and the catalyst is designated as Comparative Example 6.

Reference Example 4

A Pt/Pd/C catalyst to which a potential was applied under the following conditions instead of the catalytic activity improvement treatment of Example 4 is designated as Reference Example 4.

That is, a suspension was prepared by ultrasonically dispersing a Pt/Pd/C catalyst (without being subjected to a catalytic activity improvement treatment) in n-hexanol. Then, the catalyst was coated onto a GC electrode (diameter: 6 mm) of a rotating disk electrode so that the amount of Pt would be 14.1 μg/cm$^2$ to prepare a working electrode. The prepared electrode was immersed in a 0.1 M aqueous HClO$_4$ solution at 80° C. saturated with argon gas, and 30 cycles of 0.4 V (300 s) to 1.0 V (300 s) rectangular waves (vs. the reversible hydrogen electrode (RHE)) were applied to the Pt/Pd/C catalyst.

Reference Example 5

A PtPd/C alloy catalyst to which a potential was applied under the conditions same as in Reference Example 4 instead of the catalytic activity improvement treatment of Example 5 is designated as Reference Example 5.

Reference Example 6

A PtCo/C alloy catalyst to which a potential was applied under the conditions same as in Reference Example 4 instead of the catalytic activity improvement treatment of Example 6 is designated as Reference Example 6.

[Evaluation of Catalytic Activity]

Figure 11:
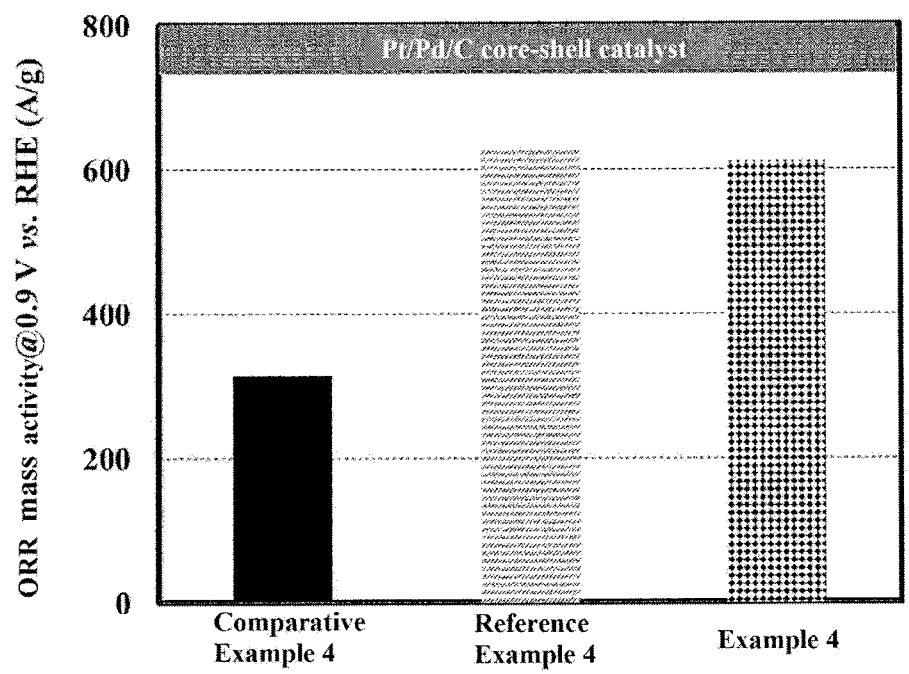
FIG. 11 shows the ORR mass activity of the Pt/Pd/C core-shell catalysts of Example 4, Comparative Example 4, and Reference Example 4.
Figure 12:
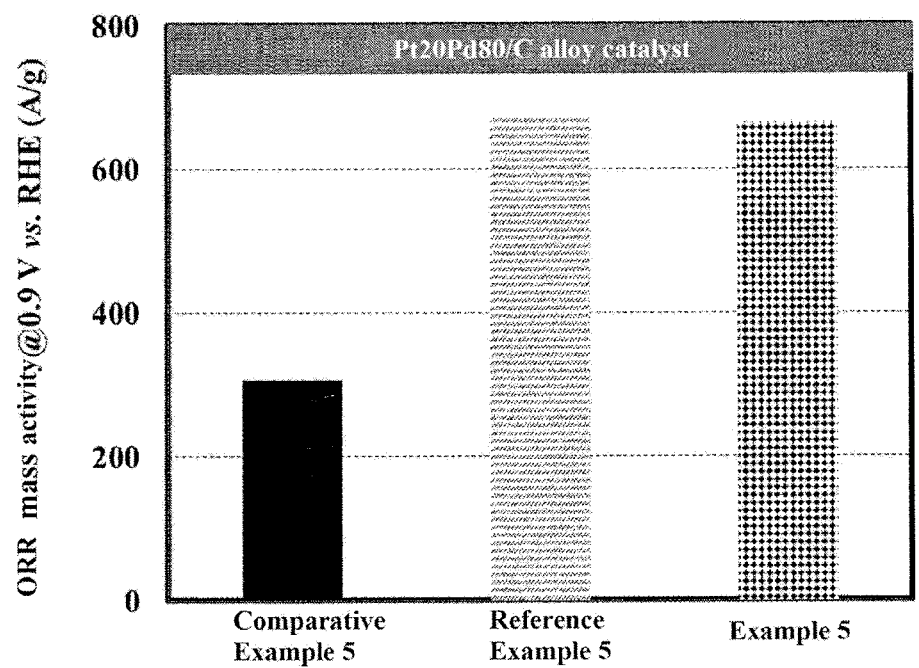
FIG. 12 shows the ORR mass activity of the PtPd/C alloy catalysts of Example 5, Comparative Example 5, and Reference Example 5.
Figure 13:
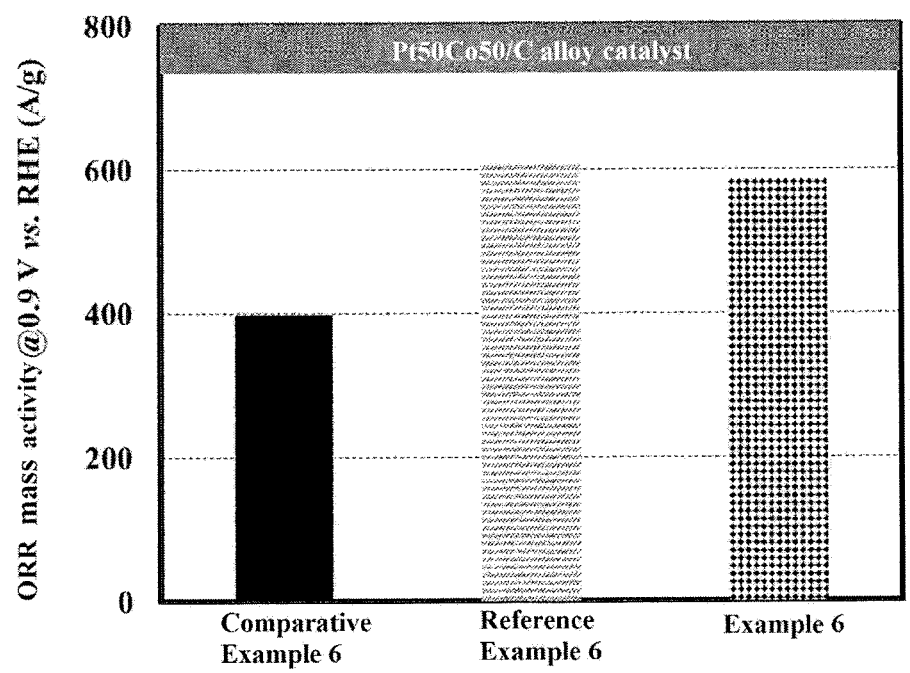
FIG. 13 shows the ORR mass activity of the PtCo/C alloy catalysts of Example 6, Comparative Example 6, and Reference Example 6.

The ORR activities of the catalysts of Examples 4 to 6, Comparative Examples 4 to 6, and Reference Examples 4 to 6 were evaluated by the rotating disk electrode method same as in Examples 1 to 3. The calculated ORR mass activity (MA) is shown in FIGS. 11 to 13 and Table 4 below.

TABLE 4

Improvement in ORR mass activity by catalytic activity improvement treatment (solid-gas method)

| | ORR mass activity of catalyst @ 0.9 V vs. RHE (A/g$_{Pt}$) | | | | | |
|---|---|---|---|---|---|---|
| | Pt/Pd/C | | Pt$_{20}$Pd$_{80}$/C | | Pt$_{50}$Co$_{50}$/C | |
| Comparative Example (No treatment) | (Comparative Example 4) | 315 | (Comparative Example 5) | 307 | (Comparative Example 6) | 398 |
| Reference Example (GC electrode treatment) | (Reference Example 4) | 476 | (Reference Example 5) | 672 | (Reference Example 6) | 609 |
| Example (Solid-gas method) | (Example 4) | 612 | (Example 5) | 665 | (Example 6) | 585 |

As shown in Table 4, the ORR mass activities of the catalysts of Examples 4 to 6 were improved to about 1.5 to 2.2 times those of Comparative Examples 4 to 6. In addition, the catalysts of Examples 4 to 6 exhibited ORR mass activities at the same level or superior to those of Reference Examples 4 to 6. This result demonstrates that the method of the present invention can reproduce the phenomenon of improvement in catalytic activity caused by the application of a potential using a GC electrode and potentiostat.

The invention claimed is:

1. A method of manufacturing a platinum catalyst for fuel cells, comprising:
   (a) a step of preparing the platinum catalyst as one of
      (i) a platinum core-shell catalyst having palladium-containing core particles and platinum shells formed on surfaces of the core particles, and
      (ii) a platinum alloy catalyst of platinum and palladium or cobalt;
   (b) a step of dispersing the platinum catalyst in an acidic dispersion solution containing protons;
   (c) a step of allowing a gas and/or a solid that generates a potential higher than an onset potential of platinum oxide formation to be present in the dispersion solution; and
   (d) a step of allowing a gas and/or a solid that generates a potential lower than an onset potential of reduction of platinum oxide to be present in the dispersion solution.

2. The method of claim 1, wherein the steps (c) and (d) are carried out alternately a plurality of times.

3. The method of claim 1, wherein the steps (c) and (d) are each carried out for a predetermined duration.

4. The method of claim 3, wherein the predetermined duration is within a range of 1 to 30 minutes.

5. The method of claim 1, wherein the step (c) includes a step (e) of feeding a gas that generates the potential higher than the onset potential of platinum oxide fomlation, and wherein the step (d) includes a step (f) of feeding a gas that generates the potential lower than the onset potential of reduction of platinum oxide.

6. The method of claim 5, wherein, in step (f), the gas that generates the potential lower than the onset potential of reduction of platinum oxide is hydrogen.

7. The method of claim 1, wherein the step (c) includes a step (e) of feeding a gas that generates the potential higher than the onset potential of platinum oxide fomlation, and, wherein the step (d) includes a step (f) of feeding an inert gas while allowing a solid that generates the potential lower than the onset potential of reduction of platinum oxide to be present in the dispersion solution.

8. The method of claim 7, wherein, in step (f), the solid that generates the potential lower than the onset potential of reduction of platinum oxide is copper, and wherein the inert gas is argon gas or nitrogen gas.

9. The method of claim 5, wherein, in step (e), the gas that generates the potential higher than the onset potential of platinum oxide formation is a gas containing oxygen.

10. The method of claim 1, wherein the acidic dispersion solution containing protons is a sulfuric acid solution.

11. The method of claim 1, further comprising a step of feeding inert gasses between the steps (c) and (d).

* * * * *

UNITED STATES PATENT AND TRADEMARK OFFICE
CERTIFICATE OF CORRECTION

PATENT NO. : 10,749,186 B2  
APPLICATION NO. : 15/554470  
DATED : August 18, 2020  
INVENTOR(S) : Minoru Inaba et al.

Page 1 of 1

It is certified that error appears in the above-identified patent and that said Letters Patent is hereby corrected as shown below:

On the Title Page

Assignees Should read as:  
The Doshisha, Kyoto (JP)  
Ishifuku Metal Industry Co., Ltd., Tokyo (JP)

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*